April 13, 1954   F. M. SPAYD   2,675,142
DIRECT SEAL CLOSURE
Filed April 19, 1949   4 Sheets-Sheet 1

INVENTOR.
FRED M. SPAYD
BY

April 13, 1954

F. M. SPAYD 2,675,142

DIRECT SEAL CLOSURE

Filed April 19, 1949

FRED M. SPAYD
INVENTOR.

BY

INVENTOR.
FRED M. SPAYD
BY

April 13, 1954  F. M. SPAYD  2,675,142
DIRECT SEAL CLOSURE

Filed April 19, 1949  4 Sheets-Sheet 4

INVENTOR.
FRED M. SPAYD
BY

Patented Apr. 13, 1954

2,675,142

UNITED STATES PATENT OFFICE 2,675,142

DIRECT SEAL CLOSURE

Fred M. Spayd, Van Wert, Ohio, assignor to Spayd Metal Products Corporation, a corporation of Ohio Application April 19, 1949, Serial No. 88,265

3 Claims. (Cl. 220—39)

This invention relates to closures for containers and the like, and more particularly deals with a closure adapted to be used on drums, barrels, bags, cells, and the like containers made of various materials and useful for storing or carrying fluids of the kind and sort generally stored or carried in such containers.

More particularly, the present invention deals with a closure of a type characterized by the rapidity with which it may be closed and/or opened, the tightness of the seal which it effects, and the ease and economy of its manufacture and use.

More particularly the present invention deals with a closure adapted securely to seal containers against pressure and vacuum so as to prevent breathing; one which because of characteristics inherent in its design may be easily attached to containers of various sorts and types; one which effects sealing engagement against the body of the container with the innermost extremity of the closure plug; and one which because of its novel construction or structure may be made of ordinary materials such as sheet iron and the like but may be used in connection with containers made of other materials, such as corrosion resisting materials, and used to store or carry substances which ordinarily would be injurious to the material, such as sheet iron and the like, of which the closure is made.

The nature of the present invention and the manner in which it may be advantageously utilized in certain typical embodiments thereof will be fully ascertained and comprehended from the following description taken in connection with the annexed drawing, wherein:

Fig. 13 is a plan view of a gasket retainer having a ring or hanger on the bottom on which may be attached a pouring spout or the like;

Figure 1:
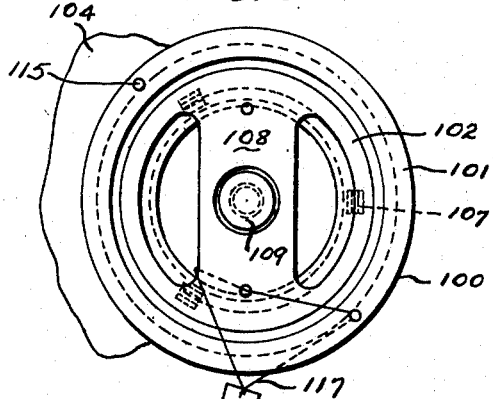
Fig. 1 is a plan view of a closure according to this invention.

Since the drawings illustrate several embodiments of this invention, the several views illustrating each embodiment will now be considered together as separate groups.

Embodiments of Figs. 1 to 4

Referring now to the drawings, particularly Figs. 1 to 4 thereof, the numeral 100 generally designates a closure consisting of a collar portion 101, a plug portion 102, and a gasket 103. The collar portion 101 is mounted on a container generally designated by the numeral 104. On the container 104 is formed a collar 105 arranged to receive the closure collar 101 in engagement therewith. The lip of the container collar 105 is rolled over the inner flange 106 of the closure collar 101 to provide permanent engagement of the closure collar 101 with the container 104. It is at times advantageous to provide a plurality of pegs or protrusions 107 arranged to register with corresponding notches or slots whereby to prevent relative movement of the closure collar 101 and the container collar 105.

The closure plug 102 is provided with a cross-bar member 108 arranged rotatably to mount a stud member 109. The stud 109 is fixedly mounted onto a cover plate 110 as at 111 by welding, brazing, or otherwise, but is free to move with relation to the cross-bar 108 and carried thereby.

The gasket 103 fits snugly around the circumference of the cover plate 110 and under the outwardly extending flange 112, so that when pressure is exerted downwardly on the cover plate 110, as when the closure plug 102 is screwed onto the closure collar 101, the gasket 103 is pressed firmly against the bead 113 formed by rolling or crimping the container collar 105 over the inner flange 106 of the closure collar 101. This is clearly shown in Fig. 2.

Figure 4:
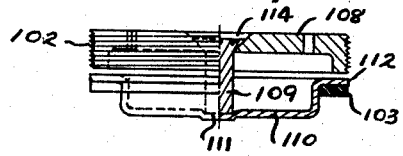
Fig. 4 is an elevational view, partly in cross-section, taken along the line 4—4 of Fig. 3.

As fully illustrated in Fig. 4, the cover plate 110 hangs loosely from the cross-bar 108 on the stud 109. When the cross-bar 108 is turned whereby to screw the threads on the closure plug 102 onto the threads of the closure collar 101, the threaded portion of the closure plug 102 is forced downwardly against the flange 112 of the cover plate 110. As this operation proceeds and more pressure is applied by further turning of the cross-bar 108, the flange 112 of the cover plate 110 will force the gasket 103 into contact with the bead 113. As this takes place, the gasket will cease rotational movement because of the frictional effect of the rubber or similar material used for the gasket against the metal of the bead 113, thus preventing displacement, tearing or extrusion of the gasket material; however, the plug 102 may continue to turn within the collar 101 and travel downwardly therein, since the metal-to-metal contact between the flange 112 of the cover plate 110 and the plug itself permits this rotational movement. Since the cover plate is fixedly mounted onto the stud 109, and the latter is loosely held by the cross-bar 108, this relative movement is made possible. Obviously, as threaded engagement proceeds between the plug 102 and the collar 101, the gasket 103 will effect firm seating engagement against the bead 113, and this seating engagement is clearly illustrated in Fig. 2. It will be noted that at this point the stud 109 is away from the walls of the conical depression 114 on the cross-bar 108 within which the head of the stud 109 is arranged in the instant embodiment.

As illustrated particularly in Fig. 1, the closure collar 101 is provided with a plurality of seal receiving orifices 115, and the closure plug 102 is also provided with similar orifices 116. When a tamper seal is desired to be used in connection with the closure 100, a seal wire 117 is passed through one or more of each of the orifices 115 and 116 (see Fig. 1) and joined with a tamper seal 118.

Figure 2:
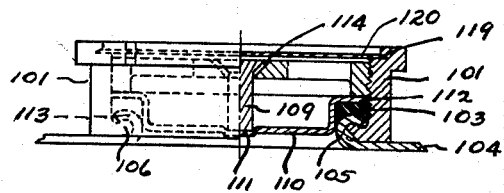
Fig. 2 is an elevational view, partly in cross-section, of the closure of Fig. 1.
Figure 5:
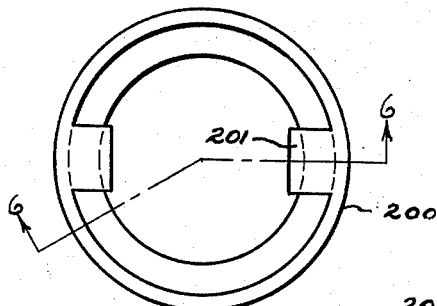
Fig. 5 is a plan view of another closure plug according to this invention.

The closure collar 101 may be advantageously provided with a disc receiving groove 119 arranged to receive a disc seal 120 as shown in Fig. 2.

Embodiments of Figs. 5 to 9

Referring now to Figs. 5 to 9 in particular, 200 is a closure plug provided with a plurality of inwardly turned ears 201 and arranged for threaded engagement along its upper circumference, as at 202. Along the lower portion of the plug 200 is provided an annular groove 203 arranged to receive a plurality of dimples 204 formed along the inner circumference of a cover plate 205. The cover plate 205 is substantially cup-shaped in the instant embodiment of the invention, with an outwardly extending flange 206 and a shoulder 207 arranged to hold a gasket 208 therebetween.

Figure 6:
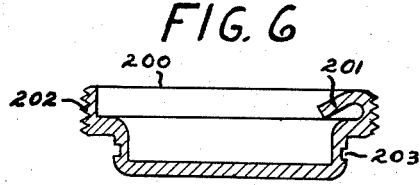
Fig. 6 is a cross-sectional view taken along the line 6—6 of Fig. 5.
Figure 3:
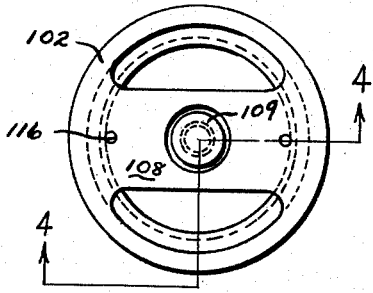
Fig. 3 is a plan view of the plug portion of the closure of Fig. 1.
Figure 7:
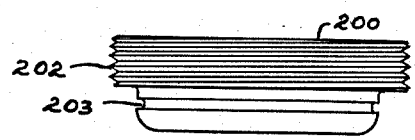
Fig. 7 is an elevational view of the plug of Fig. 5.
Figure 8:
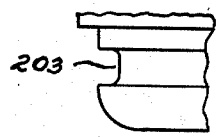
Fig. 8 is an enlarged view of a portion of the lower part of the plug of Fig. 7.
Figure 9:
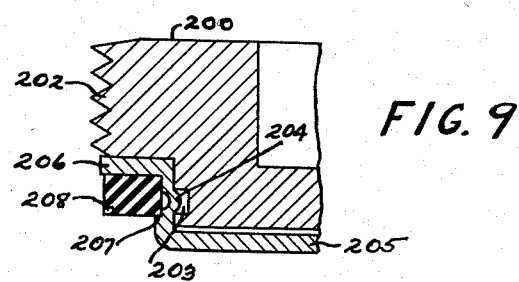
Fig. 9 is an enlarged fractional view of the lower portion of a plug according to this invention showing one manner of mounting the cover plate along the bottom of the plug and holding the gasket in association therewith.

The annular groove 203 may be machined as shown in Fig. 9 or it may be pressed in as shown in Fig. 7 and Fig. 8. In like manner, the bottom of the plug 200 may be sharp and angular as shown in Fig. 9 or it may be rounded as shown in Fig. 6, Fig. 7 and Fig. 8. These are matters of choice or expedience and do not affect the fundamental basis of the present invention, but reflect the versatility thereof and the ease with which it may be practiced.

The cover plate 205 is free to move with respect to the annular groove 203 and the plug 200 per se. Therefore, when the plug 200 is screwed onto a closure collar (which may be of various forms, as hereinafter set forth), the cover plate 205 and gasket 208 carried thereby will turn with the plug 200 until the gasket 208 makes contact with the closure seat, whereupon the cover plate 205 and gasket 208 carried thereby will cease to turn with respect to the closure seat, so that the gasket 208 cannot be displaced, torn or extruded. Since the cover plate 205 is free to move in the annular groove 203 by means of the dimples 204 which loosely hold it in place, the cover plate 205 and gasket 208 carried thereby are free to and do accommodate themselves to the contour of the closure seat, thereby insuring a tight fit and seal irrespective of surface variations in the closure seat.

Embodiments of Figs. 10 to 16

Figure 10:
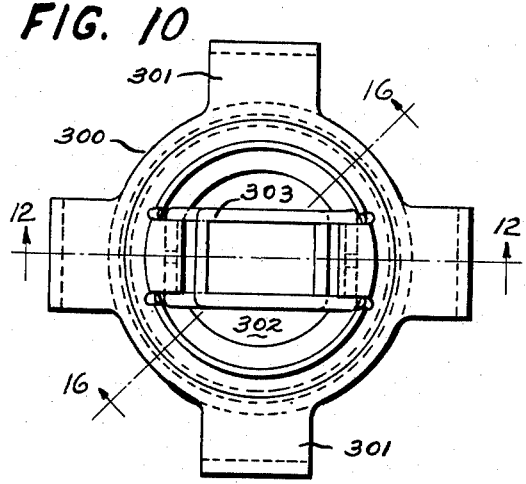
Fig. 10 is a plan view of another closure according to this invention.
Figure 11:
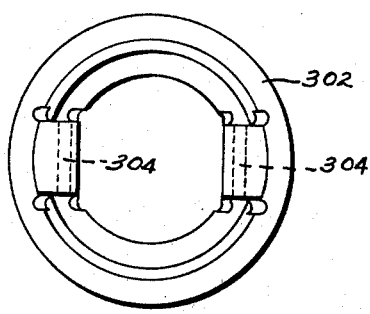
Fig. 11 is a plan view of the plug forming part of the closure of Fig. 10.
Figure 12:
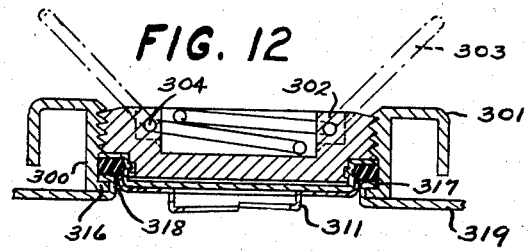
Fig. 12 is a cross-sectional view taken along the line 12—12 of Fig. 10.

Referring now to Figs. 10 to 16 in detail, and particularly Fig. 10, the numeral 300 represents a closure collar provided with a plurality of ears 301 forming a grip. A plug 302 provided with a plurality of foldable handles 303 is provided arranged for threaded cooperation with the closure collar 300 as shown in Fig. 12. The handles 303 are mounted on a plurality of hinges 304, and in their open or extended position (as shown in Fig. 12) may be used to turn the plug 302 with one hand, as in opening or closing the closure, while gripping the ears 301 with the other hand, thus facilitating the operation.

The plug 302 is provided with an annular groove 305 arranged to receive a plurality of dimples 306 formed along the inner circumference of the cover plate 307. The cover plate 307 is provided with an inwardly extending flange 308 arranged to cooperate with a gasket 309.

Figure 14:
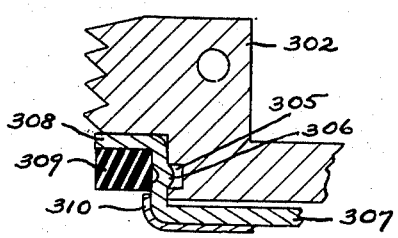
Fig. 14 is a fragmentary cross-sectional view of the plug portion of Fig. 12 showing another manner of holding the gasket in place.

As will be noted from Fig. 14, the gasket 309 is held in position under the flange 308 of the cover plate 307 by a gasket retainer 310 which is fixed onto the cover plate 307 as by spot welding.

Figure 16:
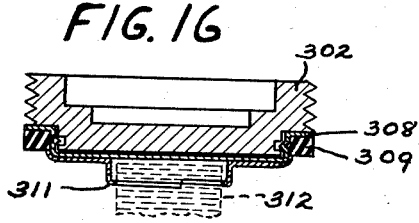
Fig. 16 is a cross-sectional view taken along the line 16—16 of Fig. 10, showing the manner in which a pouring spout or extra vent plug may be carried on the gasket retainer of Fig. 12.
Figure 17:
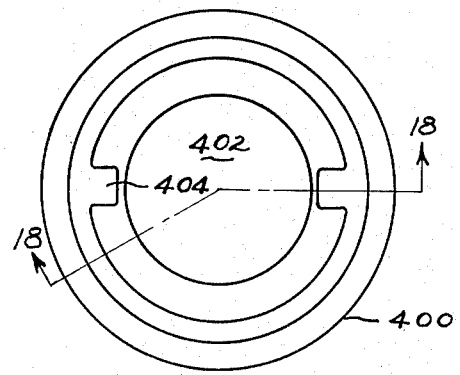
Fig. 17 is a plan view of another closure according to this invention.
Figure 21:
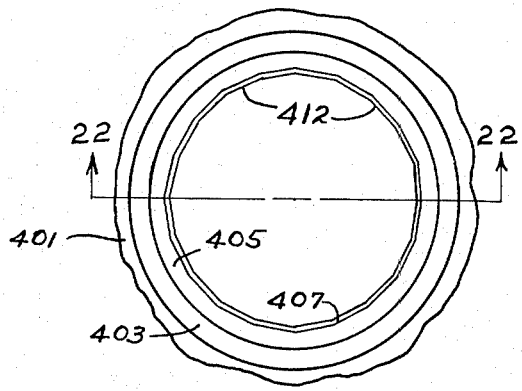
Fig. 21 is a plan view of the collar portion of one form of the present invention with a series of flats along the inner flange thereof in register with corresponding flats on the container collar.

In one modification, illustrated in Fig. 12, the gasket retainer 310 may be formed as at 311 to receive in threaded engagement the threaded end of a pouring spout or the like as at 312 (see Fig. 16).

Figure 13:
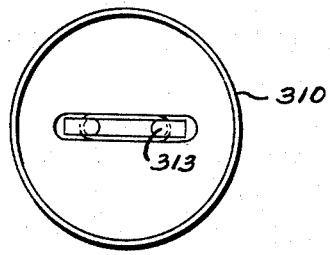
Figure 15:
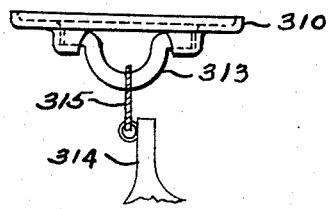
Fig. 15 is an elevational view of the gasket retainer of Fig. 13.

In another modification, as shown in Fig. 13 and Fig. 15, the gasket retainer 310 may be provided with a ring or hanger 313 arranged to carry a pouring spout 314 or the like which may be carried thereon by means of a flexible wire 315 or the like.

Referring again to Fig. 12, it will be noted that the closure collar 300 is provided with an inwardly extending flange 316 over which is crimped the end 317 of the container collar 318 of the container 319. It is thus evident that the gasket 309 bears flush against the crimped end 317 of the container collar 318, forming a tight and full seal thereagainst. Since the cover plate 307 is free to adjust itself and the gasket 309 carried thereby according to the contour of the closure seat (which is the crimped end 317 of the container collar 318), and the gasket cannot be displaced, torn or extruded as has been explained hereinbefore, the sealing engagement effected between the plug 302 through the cover plate 307 and gasket 309 carried thereby against the container collar 318 is firm and secure against pressure and vacuum.

*Embodiments of Figs. 17 to 24*

Referring now to Figs. 17 to 24, the numeral 400 generally indicates a closure mounted on a container 401. The closure 400 comprises a plug portion 402 and a collar portion 403. The plug 402 is provided with a plurality of inwardly extending ears 404 arranged to receive a tool or the fingers for turning engagement. The closure collar 403 is provided with an inwardly extending flange 405 over which is crimped the end 406 of the container collar 407 formed on the container 401 to receive the closure 400.

Figure 25:
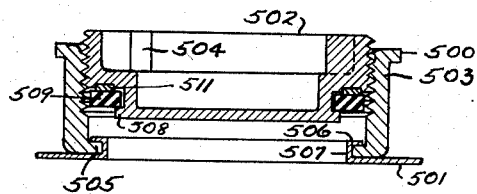
Fig. 25 is an elevational cross-sectional view of still another form of the present invention showing the plug away from the seat.
Figure 26:
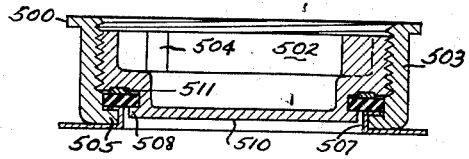
Fig. 26 is a view similar to Fig. 25, but with the plug firmly seated against the closure seat.

The closure plug 402 is provided with a shoulder 408 formed integral therewith arranged to hold a gasket 409. As is clearly shown in Fig. 18, as the plug 402 is screwed down onto the closure collar 403, the gasket 409 held over the shoulder 408 will be pressed down against the crimped end 406 of the container collar 407 forming a sealing engagement therebetween without extruding the gasket 409, since it is firmly held and supported on all sides. The plug 402, however, need not be formed with a shoulder 408 as in Fig. 18. For example, the bottom portion of the plug 402 may be formed with a straight side as in Fig. 19, and a gasket retainer 410 may be fixed thereunto as by spot welding as illustrated in Fig. 19. These embodiments of the present invention are useful particularly where relatively minor pressure is required to effect sealing engagement, as in the case of containers holding particulate matter, such as granular materials. Where liquids are concerned, particularly highly volatile liquids and the like, the invention may be modified advantageously as illustrated in Figs. 25 and 26 to permit the application of greater torque in effecting the seal without damaging the gasket.

The closure collar 403 is generally formed with a series of flats 411 along the circumference of the inner flange 405 thereof, and the container collar 407 is then likewise provided with a series of flats 412 arranged to register with the flats 411 when the closure collar 403 is placed over the container collar 407. This is particularly illustrated in Fig. 24.

When the closure collar 403 is to be automatically installed on the container collar 407, as by automatic machinery, both the collar 403 and the collar 407 are provided with indexing means, such as slight protrusions, ridges, or the like, for the purpose of insuring that the closure collar 403 will drop over the container collar 407 with the flats 412 and 411 in register; however, this feature does not form part of the present invention, but is disclosed and claimed in copending application Serial No. 176,563, filed July 29, 1950, which deals with apparatus and method for forming and installing the closures of the present invention.

Figure 20:
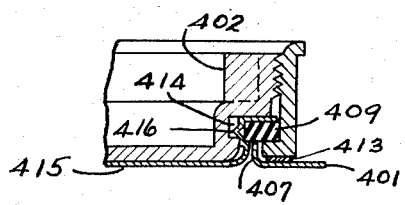
Fig. 20 is a fragmentary cross-sectional view showing another manner of mounting the collar portion of the closure on the container, as by brazing.
Figure 24:
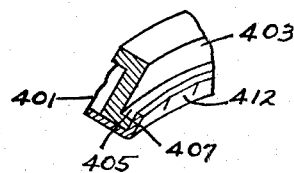
Fig. 24 is an enlarged fragmentary view, partly in cross-section, showing the manner in which flats on the closure collar and the container collar come in register before the latter is crimped over the former.

While the register of the flats 411 on the flange 405 of the closure collar 403 with the flats 412 on the container collar 407 provides, after crimping the end 406, a tight and immovable connection or joint, there are certain applications wherein another type of joint or connection between the container collar 407 and the closure collar 403 proves desirable and advantageous. Therefore, there may be provided according to the present invention another form of joint which is illustrated in Fig. 20. The collar 407 of the container 401, it will be noted, is not crimped over the flange 405 of the closure collar 403, although it may be crimped if so desired. As shown in Fig. 20, a ring of brazing material 413 is placed between the closure collar flange 405 and the body of the container 401 adjacent the container collar 407. When subjected to brazing temperature, the brazing material 413 welds or binds the bottom of the flange 405 to the surface of the container 401 adjacent the container collar 407, thus forming a tight and strong seal. Obviously, of course, the container collar 407 and the closure collar flange 405 may be provided with flats 412 and 411, respectively, as has been described hereinbefore, even when the joint or connection is effected by a brazing operation or the like rather than by crimping. In fact, this is the general procedure, since a single set of forming tools for the closure collar 405 and the container collar 407 may thus be used irrespective of the ultimate manner in which the joint or connection between the closure 400 and the container 401 is effected. As has been noted hereinbefore, the container collar 407 may be crimped if so desired over the flange 405 even when a joint is made by a brazing operation.

Referring further to Fig. 20, it will be noted that the plug 402 is provided with an annular groove 414 arranged to receive a cover plate 415 by means of a plurality of dimples 416 provided along the inner circumference thereof. The cover plate 415 is arranged to cooperate with the gasket 409 whereby to maintain said gasket 409 mounted on the plug 402, and the sealing engagement between the gasket 409 and the container 401 is effected with the container collar 407 without displacing, tearing or extruding said gasket 409.

Embodiments of Figs. 25 and 26

Figure 18:
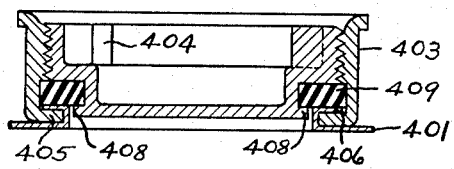
Fig. 18 is a cross-sectional view taken along the line 18—18 of Fig. 17, and illustrates another manner of holding the gasket in position.
Figure 22:
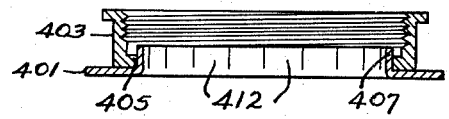
Fig. 22 is a cross-sectional view taken along the line 22—22 of Fig. 21 further illustrating the register of the flats on the closure collar and the container collar before crimping of the latter over the former for mounting purposes.
Figure 19:
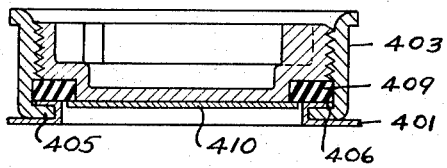
Fig. 19 is a cross-sectional view similar to Fig. 18, and illustrates still another manner of holding the gasket.
Figure 23:
Fig. 23 is an enlarged fragmentary view showing the flats along the inner flange of the closure.

Fig. 25 and Fig. 26 illustrate a modification of the embodiment of this invention illustrated in Figs. 18 and 19, as hereinbefore mentioned. The modification of Figs. 25 and 26 is particularly useful where highly volatile liquids are being handled, and permits the application of high torque to effect the sealing engagement.

In Figs. 25 and 26 the numeral 500 generally represents a closure mounted on a container 501, and comprising a plug portion 502 and a collar portion 503. The plug 502 is provided with a plurality of ears 504 arranged to receive a tool or the fingers for turning engagement. The collar 503 is provided with an inwardly extending flange 505 over which is crimped the end 506 of a container collar 507. The bottom of the plug 502 is provided with a shoulder 508 arranged to support a gasket 509 which, when the plug 502 has been fully screwed down onto the closure collar 503, is arranged to form sealing engagement against the crimped end 506 of the container collar 507 as shown in Fig. 26. The bottom face of the plug 502 is designated by the numeral 510.

As will be noted, a slide ring or washer 511 is provided above the gasket 509. While in Figs. 25 and 26 this slide ring 511 is illustrated as inset in the plug 502, this is not necessary, and usually is not done, the slide ring being merely passed over the shoulder 508 (the ring being of greater inside diameter than the outer diameter of the shoulder) before the gasket is mounted. When the plug 502 is screwed downwardly until the gasket touches the closure seat, which is the crimped end 506, the gasket will make frictional engagement with the seat and thereafter, in the absence of the slide ring 511 (as in the embodiment of Figs. 18 and 19), the gasket would be dragged over the seat, thus tearing it or otherwise damaging it. But in the modification illustrated by Figs. 25 and 26, this cannot occur. When frictional engagement is effected between the gasket 509 and the closure seat formed by the crimped end 506, the gasket ceases rotational movement; however, the plug 502 may continue to rotate without damaging the gasket because of the slippage between the slide ring 511 and the surface of the plug against which it bears. In other words, the slide ring 511 will be gripped by the gasket material in substantially the same manner (by frictional engagement in which the gasket material grips the closure seat. The metal-to-metal contact effected between the slide ring and the plug permits the slide ring to remain in contact (by frictional engagement) with the gasket material, and permits the plug to rotate without tearing or otherwise damaging the gasket.

Figure 27:
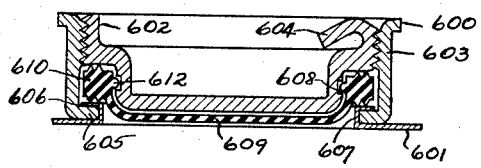
Fig. 27 is an elevational cross-sectional view of a further form of this invention, in which the cover plate is integral with the gasket and is made of an elastomeric substance such as rubber or plastic material.
Figure 28:
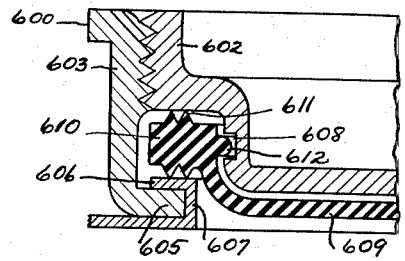
Fig. 28 is an enlarged fragmentary view of the showing of Fig. 27.

Embodiments of Figs. 27 and 28

In Figs. 27 and 28 the numeral 600 generally indicates a closure mounted on a container 601. The closure 600 comprises a plug portion 602 and a colllar portion 603. The plug 602 is provided with a plurality of ears 604 arranged to receive a tool or the fingers for rotational engagement, as in opening or closing the closure 600 by screwing or unscrewing the plug 602 in or out of the closure collar 603. The closure collar 603 is provided with an inwardly extending flange 605 over which is crimped the end 606 of the container collar 607. The plug 602 is provided with an annular groove 608 arranged to receive a cover plate 609 made of elastomeric material such as rubber or plastic material. The cover plate 609 has integrally formed gasket portion 610 provided with an internally protruding lip or ring 612 arranged loosely to fit in the annular groove 608 whereby to maintain the cover plate 609 and gasket portion 610 thereof in proper position with relation to the bottom face or surface of the plug 602. The gasket portion 610 of the cover plate 609 may be provided with a plurality of circular ridges 611 arranged to effect sealing engagement against the plug 602 at a point directly below the threaded portion thereof and against the closure seat which is the crimped end 606 of the container collar 607. These circular ridges prove particularly advantageous when the cover plate 609 and gasket portion 610 forming part thereof is made from plastic material, such as polyethylene or the like, which does not possess the degree of elasticity of rubber and the like, since the ridges 611 then serve to effect knife-edge sealing as they are depressed by the application of pressure as the plug 602 is screwed down onto the closure collar 603 to effect sealing engagement.

General arrangement and operation

In reviewing the drawings it will be noted that the several embodiments of the present invention illustrated thereby have certain common characteristics. For example, in each instance the sealing engagement is between the gasket, which invariably lies along the lowermost portion of the closure plug, and the body of the container itself. This characteristic is particularly well illustrated in Figs. 2, 12, 18, 19, 20, 26, 27 and 28.

In each embodiment illustrated the closure collar is firmly joined or connected with the container at the point of sealing engagement. This characteristic is particularly well illustrated in Figs. 2, 12, 18, 19, 20 and 25 to 28. In each the joining or connecting is effected by crimping of the container collar over a flange along the lower inner portion of the closure collar, except in the embodiment illusrated in Fig. 20 wherein the joining or connecting is effected by brazing; and even in the case of brazed connection, as has been noted hereinbefore, crimping may be utilized advantageously.

Another important characteristic of the present invention lies in the fact that the bottom of the closure plug (that is to say, the portion in contact with the contents of the container) is loosely mounted with respect to the threaded portion of the plug, so that it may swivel and rock and thus adjust itself to the contour of the closure seat to effect sealing engagement. This is well illustrated in Figs. 2, 4, 12, 27 and 28.

One other important characteristic of the closure of this invention resides in the use of a cover plate over the lowermost portion of the closure plug and mounted thereon. The use of the cover plate makes it possible to use a standard material of construction for the closure plug and closure collar; that is to say, when the container is made of other than common materials, such as corrosion resisting material, it is only necessary to provide the closure plug with a cover plate of similar material. This is because the contents of the container will come into contact in transit and storage only with the cover plate.

The economy of manufacture and ease of installation are two other important characteristics of the closure of the present invention. As those skilled in the art will readily appreciate, the closure of this invention may be manufactured by simple production techniques using equipment normally found in metal working plants; and it may be installed with simple tools in a single manufacturing operation. Those skilled in the art will also note that, unlike other closures now commercially available, the closure of the present invention, in all its embodiments and modifications, is installed from above rather than from below the container, thus greatly facilitating the operation and materially simplifying the apparatus required therefor.

It will also be noted by those skilled in the art from inspection of the drawings and perusal of the foregoing disclosure, that the closure of this invention in its several embodiments permits the gasket to cease rotational movement the moment it comes into engagement with the seat against which it will rest to form a seal, while permitting the closure plug to continue turning until a firm and tight seal is effected. The exception is illustrated in Figs. 18 and 19, which are intended for uses wherein low torque is required to effect a seal, but even in that case the closure may be modified as shown in Figs. 25 and 26 to accomplish the same purpose. This novel feature of design and construction prevents distortion, tearing and extruding of the gasket, thereby permitting repeated use of the same gasket over and over again. This is particularly important when the container is used for storage primarily, and the plug has to be removed and replaced from time to time as contents is withdrawn from or added to the container. Another novel feature of this invention is that, because of the metal-to-metal slippage which is present in all embodiments other than that shown in Figs. 18 and 19, less torque is required to effect the same degree of seating engagement. This makes it possible in most instances to obtain a firm seal manually rather than by the use of special tools.

Although there have been set forth herein some of the new, novel and valuable characteristics of the present invention in some of its typical embodiments, those skilled in the art will perceive other advantages than those which have been set forth herein by way of example.

Details of construction and arrangement of parts are wholly interchangeable in the several embodiments of the present invention. For example, the cross-bar of Fig. 3 may be used in place of foldable handles such as shown in Fig. 12 or in place of the ears shown in Figs. 5 or 17 or 27. In like manner, the mode of holding the gasket illustrated in Fig. 9 or in Fig. 14 or Fig. 18 or Fig. 19 or Fig. 28 may be employed interchangeably. Other similar interchangeable arrangements will be evident to those skilled in the art as they review the drawings and the foregoing description.

While there have been described herein and illustrated in the drawings certain specific embodiments of this invention, it is not intended thereby to have this invention limited to or circumscribed by the specific details of construction, arrangement of parts, procedures, materials or methods herein set forth or illustrated in the drawings, in view of the fact that this invention is susceptible to modification according to individual preference and conditions without necessarily departing from the spirit of this disclosure and within the scope of the appended claims.

This application is a continuation-in-part of copending applications Serial No. 607,364, filed July 27, 1945, Serial No. 3,273, filed January 20, 1948, and Serial No. 76,959, filed February 17, 1949, all now abandoned.

I claim:

1. A closure plug for a container having an integral upwardly extending lip defining an opening and having a threaded collar portion above said opening comprising an outwardly threaded body arranged for threaded engagement with said collar portion, an annular groove on the side wall of said plug at a point below said threaded portion and adjacent the bottom of said plug, a sheet metal cover plate extending across the entire lower face of said plug and having an upwardly and a radially outwardly extending portion, said upwardly extending portion being indented to be received in said groove to rotatably secure said cover upon said plug, said upwardly extending portion likewise having a shoulder defining with said outwardly extending portion a seat, and a gasket receivable in said seat directly below said threads for direct thrust sealing engagement with said lip upon the tightening of said plug.

2. A closure plug for a container having an integral upwardly extending annular lip defining an opening and having a threaded collar portion above and of greater inner diameter than said lip, comprising an outwardly threaded body arranged for threaded engagement with said collar portion, a sheet metal cover plate of generally cup shape extending across the entire lower face of said plug and including an upwardly extending portion, said upwardly extending portion terminating in a radially extending peripheral flange proportioned to overlie said lip in the closed position of said plug, an annular gasket receivable on said cover plate directly below said flange for direct thrust sealing engagement with said flange and said lip upon the tightening of said plug, said body including a downwardly facing annular shoulder below said threaded portion thereof and proportioned to overlie said flange in freely contacting relation therewith, and means forming a loosely rotatable connection between said cover plate and said body constructed to retain said body and said plate in permanently interconnected relation while providing for frictional locking of said gasket with said lip and for relatively rotatable thrust engagement of said shoulder with said flange positively urging said gasket against said lip during final tightening of said plug.

3. A closure plug for a container having an integral upwardly extending annular lip defining an opening and having a threaded collar portion above and of greater inner diameter than said lip, comprising a body having an outwardly threaded upper portion arranged for threaded engagement with said circular portion and including also a lower portion of smaller diameter than said threaded portion, a sheet metal cover plate of generally cup-shape including an upwardly extending portion received over said lower body portion, said upwardly extending portion terminating in a radially extending peripheral flange proportioned to overlie said lip, an annular gasket receivable on said cover plate directly below said flange for direct thrust sealing engagement with said lip upon the tightening of said plug, said lower body portion having a circumferential groove therein, said cover plate having portions indented into said groove to form a loosely rotatable connection positively retaining said cover plate and said body together while providing for frictional locking of said gasket with said lip during final tightening of said body, and said body having a downwardly facing annular shoulder below said threaded portion and proportioned to overlie said flange in freely contacting relation therewith for direct thrust engagement with said flange causing said flange to urge said gasket against said lip to complete the sealing of said closure on said container.

References Cited in the file of this patent

UNITED STATES PATENTS

| Number | Name | Date |
|---|---|---|
| 1,060,913 | Lawrence | May 6, 1913 |
| 1,493,058 | Wacker | May 6, 1924 |
| 1,635,122 | Henriques | July 5, 1927 |
| 1,878,327 | Rimmelspacher et al. | Sept. 20, 1932 |
| 2,151,702 | Ilg | Mar. 28, 1939 |
| 2,190,716 | Kothny | Feb. 20, 1940 |
| 2,267,754 | Schroeder | Dec. 30, 1941 |
| 2,267,755 | Schroeder | Dec. 30, 1941 |
| 2,305,197 | Sheridan | Dec. 15, 1942 |
| 2,447,535 | Robinson | Aug. 24, 1948 |
| 2,451,599 | Wiltse | Oct. 19, 1948 |

FOREIGN PATENTS

| Number | Country | Date |
|---|---|---|
| 20,520 | Germany | Jan. 12, 1883 |
| 176,307 | Great Britain | Mar. 30, 1922 |
| 337,779 | Germany | June 7, 1921 |